Patented Nov. 16, 1943

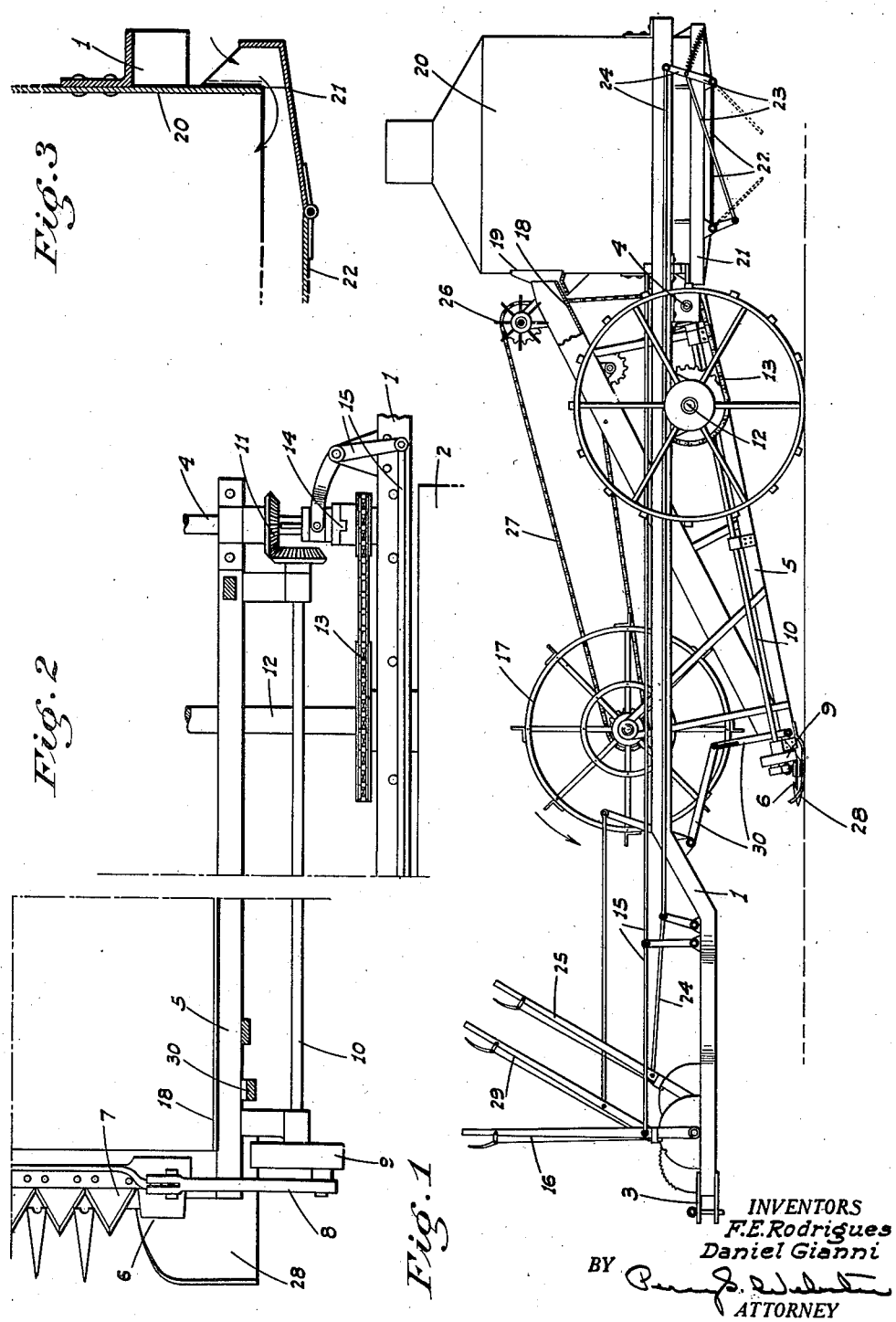

2,334,441

UNITED STATES PATENT OFFICE 2,334,441

COMBINATION REFUSE CUTTER AND BURNER

Frank E. Rodrigues and Daniel Gianni, Byron, Calif.

Application December 11, 1939, Serial No. 308,586

1 Claim. (Cl. 56—1)

This invention relates to agricultural machinery, the principal object being to provide a machine for cutting refuse or waste growth in the field, and then burning the refuse while still on the machine.

Although not limited to such use, our machine has been primarily designed to cut and burn the growth developing from asparagus plants after the cutting season is over and the stalks are left to grow unretardedly.

Before the field can be put into shape for the following cutting season, the accumulated growth must be disposed of. This is now done by cutting the growth (which is relatively tall, feathery and fast burning) by means of a mower, then subsequently forming the cut growth into piles with the use of a hay rake and a buncher, and then burning the piles while on the ground. This is not only a slow and expensive procedure, but when the asparagus is grown on peat land, as is largely the case, the land itself is apt to catch fire, sometimes with costly results. Also, due to the quick burning and light nature of the growth, it cannot be safely burned in a wind, and the operators are themselves apt to get burned.

Our improved machine eliminates these hazards and objectionable features incident to the present procedure as above outlined, and enables the growth to be quickly disposed of without possible harm to the workers or to the ground.

A further object of the invention is to produce a simple and inexpensive device and yet one which will be exceedingly effective for the purpose for which it is designed.

These objects we accomplish by means of such structure and relative arrangement of parts as will fully appear by a perusal of the following specification and claim.

In the drawing similar characters of reference indicate corresponding parts in the several views:

Figure 1 is a side elevation of the machine.

Figure 2 is a fragmentary sectional plane, particularly showing the mounting and driving of the mower.

Figure 3 is an enlarged fragmentary sectional elevation of the firebox.

Referring now more particularly to the characters of reference on the drawing, the machine comprises a main frame 1 of suitable configuration, supported intermediate its ends by ground bearing traction wheels, one of which is shown at 2, and provided at its forward end with a clevis 3 adapted for supporting draft connection with a tractor.

A cross shaft 4 journaled on the frame serves as the pivotal support for a forwardly and downwardly projecting auxiliary frame 5 on the forward end of which a mower 6 of conventional form is mounted and which includes a reciprocating sickle or knife unit 7. The unit is driven by a pitman 8 having crank connection with a pitman wheel 9. This is mounted on a shaft 10 extending along and supported from one of the side members of frame 5. At its rear end, the shaft is connected to shaft 4 by a bevel gear drive 11, the shaft 4 being itself driven from the axle 12 of wheels 2 by a chain drive 13; there being a clutch 14 between drive 13 and shaft 4. This clutch is controlled by suitable connections 15 with a lever 16 mounted on the frame 1 adjacent its forward end so that the clutch can be actuated by the tractor operator.

A reel 17 is supported from frame 5 above the mower and feeds the growth as cut onto an elevator chute 18 fixed as a unit with the frame 5, but having an upward slope to its rear end relative to frame 5. At its rear end, the elevator discharges into an opening 19 formed in the front side of a firebox 20 supported by the main frame and extending the full width of the elevator.

At its lower end, the firebox is surrounded by a pan 21, the bottom of which is spaced from the bottom of the firebox and the sides of which are spaced from the sides of the firebox and project above the lower edge thereof as clearly shown in Fig. 3. In this manner, draft air can enter the firebox all about the same, without danger of ash or burning matter spilling onto the ground.

Downwardly opening normally closed swing doors 22 are mounted on and form a large part of the bottom of the pan, these doors being connected for simultaneous opening and closing by suitable linkage 23. The doors are opened at will, to dump an accumulation of ash in the pan, by suitable connection means 24 with a control lever 25 mounted on frame 1 adjacent the lever 16 so as to be also accessible for operation from the tractor.

A booster feed wheel 26 is mounted in connection with elevator 18 adjacent its upper rear end to assure feeding of the material on the elevator into the firebox opening, the feed wheel and reel being driven at a suitable speed from shaft 4 beyond the clutch by a chain drive 27.

The mower is provided at each end with a ground engaging shoe 28 and the mower frame normally swings free to follow ground undulations. In order to lift the frame 5 and the mower and connected parts clear of the ground for transportation, we provide another lever 29 on the frame 1 near levers 16 and 25, which is connected to the mower supporting frame 5 by suitable linkage 30 as clearly shown.

In operation, at the outset a small fire is first started in the firebox, and the machine is then drawn along the row of growth to be cut and burned. Due to the arrangement of parts recited, it will be seen that the growth will be cut, elevated and fed into the firebox and burned therein without any manual handling being necessary and without danger of burning the ground. Whenever an accumulation of ash in the firebox renders it necessary, the doors 22 are dropped to dump the ash by manipulation of lever 25, and this may be done without halting the machine or having to start a fresh fire.

It is to be understood that while we have here shown a certain arrangement of control mechanisms and other parts, such arrangement is obviously capable of considerable change without departing from the spirit of the invention which essentially consists of a growth cutting means, a growth elevating means receiving from the cutting means, and a growth burner to which the elevating means delivers, all mounted as a unit on a traveling frame.

From the foregoing description it will be readily seen that we have produced such a device as substantially fulfills the objects of the invention as set forth herein.

Having thus described our invention, what we claim as new and useful and desire to secure by Letters Patent is:

A refuse gatherer and burner including with a relatively long wheel supported frame adapted at its front end for connection to a draft device and movable along the ground and refuse cutting and elevating means on the frame; a refuse burning firebox mounted on the frame rearwardly of the elevating means and to which the latter feeds, said firebox having a movable ash discharge door, and means to operate the door including a manual lever on the frame adjacent its forward end and ahead of the gathering means.

FRANK E. RODRIGUES.
DANIEL GIANNI.